(12) United States Patent
Sun et al.

(10) Patent No.: US 11,294,880 B2
(45) Date of Patent: Apr. 5, 2022

(54) METHOD, DEVICE AND COMPUTER PROGRAM PRODUCT FOR DATA PROCESSING

(71) Applicant: EMC IP Holding Company LLC, Hopkinton, MA (US)

(72) Inventors: Ao Sun, Shanghai (CN); Lu Lei, Shanghai (CN); Wesley Wei Sun, Shanghai (CN); Gary Jialei Wu, Shanghai (CN); Yu Teng, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 311 days.

(21) Appl. No.: 16/442,374

(22) Filed: Jun. 14, 2019

(65) Prior Publication Data

US 2020/0142880 A1    May 7, 2020

(30) Foreign Application Priority Data

Nov. 2, 2018   (CN) .......................... 201811301506.0

(51) Int. Cl.
  *G06F 16/00*    (2019.01)
  *G06F 16/23*    (2019.01)
  *G06F 16/2457*    (2019.01)
  *G06F 3/06*    (2006.01)

(52) U.S. Cl.
  CPC .............. *G06F 16/23* (2019.01); *G06F 3/067* (2013.01); *G06F 3/0608* (2013.01); *G06F 3/0652* (2013.01); *G06F 16/24573* (2019.01)

(58) Field of Classification Search
None
See application file for complete search history.

(56) References Cited

U.S. PATENT DOCUMENTS 8,533,158 B1 *   9/2013   Rao ........................ G06F 3/0608
                                                  707/646
8,601,222 B2 *   12/2013  Flynn .................. G06F 9/30043
                                                  711/152

* cited by examiner

*Primary Examiner* — Bai D Vu
(74) *Attorney, Agent, or Firm* — Amin, Turocy & Watson, LLP (57) ABSTRACT

Embodiments of the present disclosure provide a method, a device and a computer program product for data processing. The method comprises in response to data associated with an object being stored in the storage location, generating an entry indicating a first association relationship between the data and a storage location. The method further comprises generating metadata of the object, the metadata indicating a second association relationship between the object and the entry. Further, the method comprises in response to the first association relationship between the data and the storage location being changed, updating the entry independent of the metadata. Embodiments of the present disclosure may avoid the huge cost caused by changing metadata multiple times and reduce the system load and the impacts to the front end load.

19 Claims, 8 Drawing Sheets

METHOD, DEVICE AND COMPUTER PROGRAM PRODUCT FOR DATA PROCESSING

RELATED APPLICATION

The present application claims the benefit of priority to Chinese Patent Application No. 201811301506.0, filed on Nov. 2, 2018, which application is hereby incorporated into the present application by reference herein in its entirety.

FIELD

Embodiments of the present disclosure generally relate to data processing, and more specifically, to a method, a device and a computer program product for data processing.

BACKGROUND

Elastic Cloud Storage (ECS) uses a method specific for disk capacity management named chunks. All user data is stored in chunks instead of the file system. The chunks may be transparent to the underlying hardware and the chunks are shared. Usually, one object may be represented as a set of data segments stored to different chunks and one chunk may contain segments of multiple objects. By mean of managing the disk capacity by the chunks and storing data on the chunks in append-only way, the ECS keeps user data transparent to the underlying disk and file system may achieve the data consistency easily considering distributed systems. However, one drawback for the append-only chunk based system is more garbage and high cost when collecting the garbage.

SUMMARY

Embodiments of the present disclosure relate to a method, device and computer program product for data processing.

In a first aspect of embodiments of the present disclosure, there is provided a method for data processing. The method comprises in response to data associated with an object being stored in the storage location, generating an entry indicating a first association relationship between the data and the storage location; generating metadata of the object, the metadata indicating a second association relationship between the object and the entry; and in response to the first association relationship between the data and the storage location being changed, updating the entry independent of the metadata.

In a second aspect of embodiments of the present disclosure, there is provided a device for data processing. The device comprises at least one processor and at least one memory including a computer program instruction. The at least one memory and the computer program instruction are configured, together with the at least processor, to cause an electronic device to execute acts of: in response to data associated with an object being stored in the storage location, generating an entry indicating a first association relationship between the data and the storage location; generating metadata of the object, the metadata indicating a second association relationship between the object and the entry; and in response to the first association relationship between the data and the storage location being changed, updating the entry independent of the metadata.

In a third aspect of the present disclosure, there is provided a computer program product, which is tangibly stored on a non-transient computer readable medium and comprises a machine executable instruction, the machine executable instruction, when executed, causing a machine to execute the steps of in response to data associated with an object being stored in the storage location, generating an entry indicating a first association relationship between the data and the storage location; generating metadata of the object, the metadata indicating a second association relationship between the object and the entry; and in response to the first association relationship between the data and the storage location being changed, updating the entry independent of the metadata.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following detailed description with reference to the accompanying drawings, the above and other objectives, features and advantages of example embodiments of the present disclosure will become more apparent. Several example embodiments of the present disclosure will be illustrated by way of example but not limitation in the drawings in which.

Throughout the drawings, the same or similar reference symbols refer to the same or similar elements.

DETAILED DESCRIPTION OF EMBODIMENTS

Various example embodiments of the present disclosure will be described below with reference to the accompanying drawings. It would be appreciated that these drawings and description are only about example embodiments. It should be pointed out that alternative embodiments of the structure and method disclosed herein would be conceivable according to the following description, and these alternative embodiments may be employed without departing from principles as claimed herein.

It is to be understood these example embodiments are discussed only for the purpose of enabling those skilled persons in the art to better understand and thus implement the present disclosure, rather than suggesting any limitations on the scope of the present disclosure.

As used herein, the term "comprises", "comprises" and its variants are to be read as open-ended terms that mean "comprises/comprises, but is not limited to." The term "based on" is to be read as "based at least in part on." The term "some example embodiments" is to be read as "at least some example embodiments"; and the term "another embodiment" is to be read as "at least one another embodiment". Relevant definitions of other terms may be comprised below.

Elastic Cloud Storage (ECS) uses method specific for disk capacity management named chunks. In ECS, all user data is stored in chunks instead of the file system. Usually, one object may be represented as a set of data segments stored to different chunks and one chunk may contain segments of multiple objects.

Figure 1:
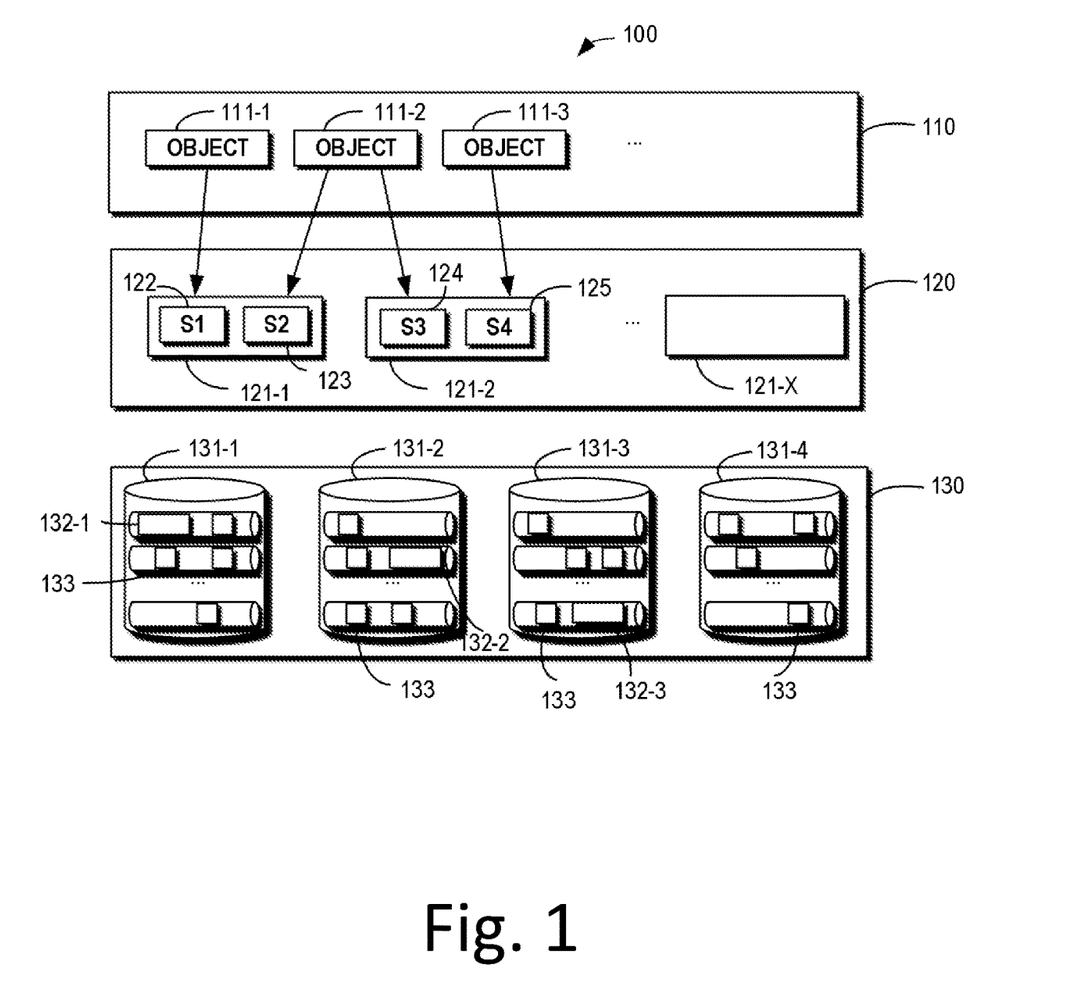
FIG. 1 shows a schematic diagram of a system 100 in accordance with some embodiments.

FIG. 1 shows a schematic diagram of a memory system 100 in accordance with some embodiments. As shown in FIG. 1, the system 100 may comprise an object layer 110, a chunk layer 120 and a hardware layer 130. The object layer 110 may comprise the objects 111-1, 111-2, and 111-3. The data of the object 111-1 may be represented as data 122, the data of the object 111-2 may be represented as the data 123 and the data 124 and the data of the object 111-3 may be represented as the data 125.

The chunk layer 120 may comprise, for example, a plurality of chunks 121-1 to 121-X. As may be seen from FIG. 1, the data 122 of the object 111-1 is stored in the chunk 121-1 and the data 123 of the object 111-2 is also stored in the chunk 121-1 while the data 124 of the object 111-2 is stored in the chunk 121-2 and the data 125 of the object 111-3 is stored in the chunk 121-2.

Further, the hardware layer 130 may comprise a plurality of disks (131-1 to 131-4) comprising a physical block 133 corresponding to the chunk. The disc may, for example, comprise a backup of the chunk, for example, the chunk 121-1 may have three backups in the hardware layer 130, namely blocks 132-1, 132-2 and 132-3.

In the system 100 shown in FIG. 1, the metadata of an object may describe, for example, the size of the data of the object and in which chunk the data of the object is stored. For example, the metadata of the object 111-2 may be represented as ([0, 2M)->A/S2, [2M, 4M)->B/S3). This metadata describes that the data 123 of the object 111-2 is stored in the chunk 121-1 (the data 123 is represented as S2, the chunk 121-1 is represented as A), while the data 124 of the object 111-2 is stored in chunk 121-2 (the data 124 is represented as S3 and the chunk 121-2 is represented as B). The data 123 and 124 may be considered as two data segments of the object 111-2. The entire data may have a size of 4M, wherein the data 123 is "([0, 2M)" in the entire data, and the data 124 is "[2M, 4M)" in the entire data.

In the system 100 illustrated in FIG. 1, the object layer only focuses on chunks, the operations, such as how to allocate physical blocks, whether they are mirrored or protected by EC, how to perform recovery, and how physical blocks are returned after chunk is deleted, etc., are hidden in the chunk layer.

Figure 2:
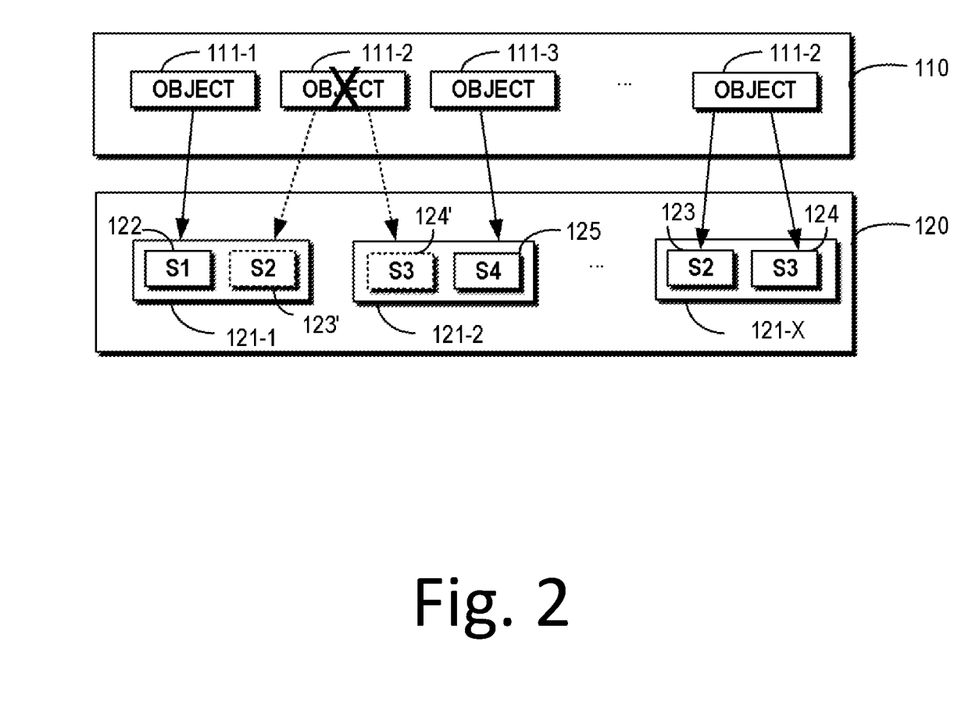
FIG. 2 shows a schematic diagram of a scenario in accordance with some embodiments.

The ECS stores data on chunks in append-only way. Once one chunk is full and sealed, the chunk is immutable. FIG. 2 shows a schematic diagram of a scenario in accordance with some embodiments. As shown in FIG. 2, when the user overwrites the object 111-2, instead of rewrote the data 123 and 124 in the chunks 121-1 and 121-2, respectively, the ECS attaches the data 123 and 124 to a new chunk. 121-X. As shown in FIG. 2, data 123 and data 124 are written to chunk 121-X. The garbage 123' and 124' of the data 123 and the data 124 are left in the original chunks 121-1 and 121-2, respectively. Further, the metadata of the object 111-2 is updated to ([0, 2M]->X/S2, [2M, 4M)->X/S3) (in which the chunk 121-X is represented as X). Similar to the above, the metadata describes in which chunk the data of the object 111-2 is stored and the respective sizes of the data.

Compared to random read-write systems, the main advantage of ECS's storage approach is simpler and easier to ensure consistency. The corruption of the newly written data 123/124 has no effect on the original copy of the data segments.

However, this storage method has the disadvantage of generating more garbage and relies highly on garbage collection (GC) to recover capacity. For example, in FIG. 2, no delete operations occur, and the update/overwrite operations are enough to consume all system capacity. The garbage collection speed determines the capacity overhead. Unfortunately, the garbage collection on the chunk based system is inherently inefficient and quite a costly operation.

First, since the chunks are shared by objects, the garbage collection requires complex calculations of the object's metadata changes to inform the garbage in the chunk. Second, the chunk is the smallest storage/protection unit for user data and the ECS expects to reclaim its capacity only when it is completely empty. Therefore, some of the garbage in the chunk is handled in a way that requires object metadata updates. This scenario will be explained below.

Figure 3:
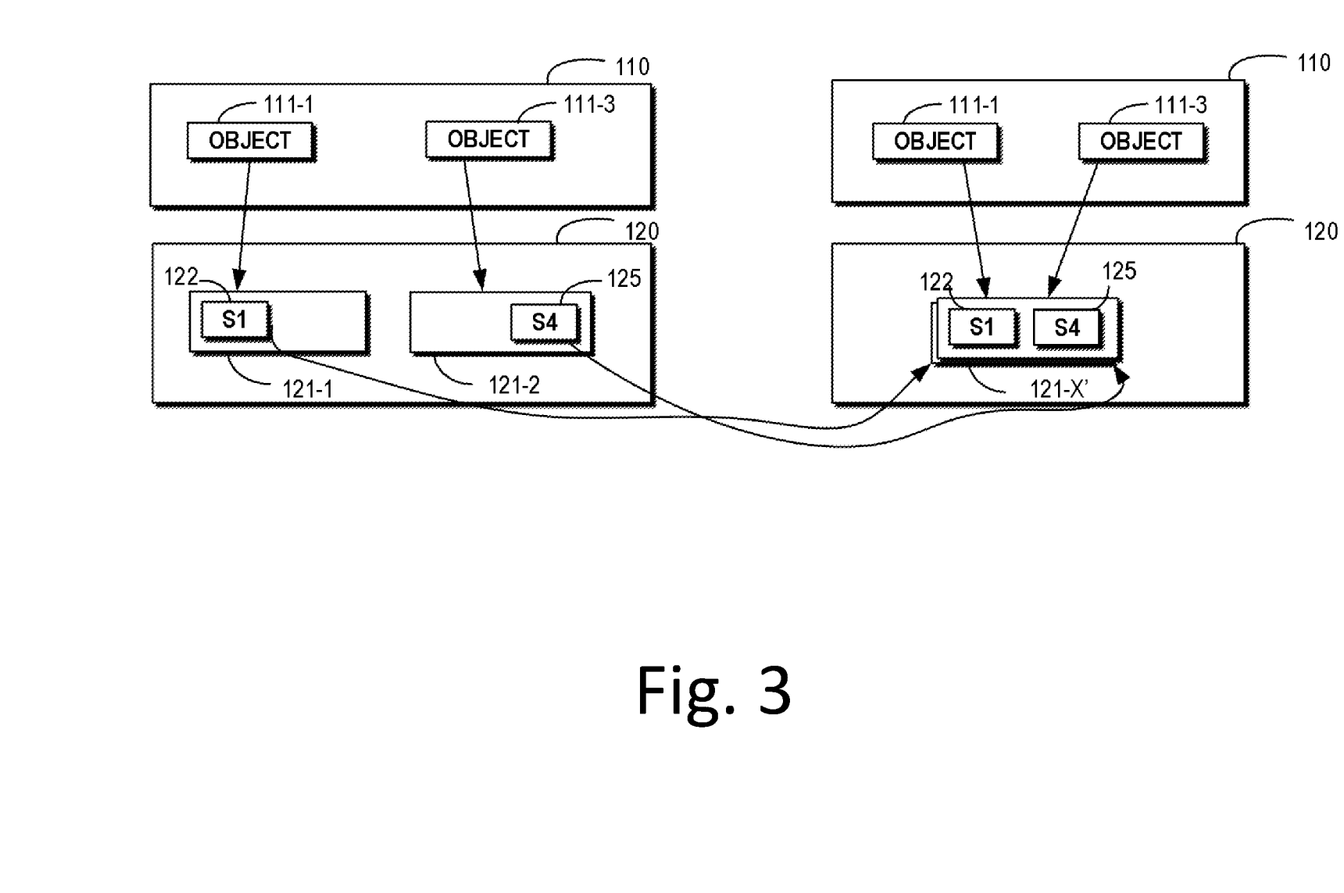
FIG. 3 shows a schematic diagram of a scenario in accordance with some embodiments.

FIG. 3 shows a schematic diagram of a scenario in accordance with some embodiments. As shown in FIG. 3, after the object 111-2 is overwritten, the data 123 in the chunk 121-1 and the data 124 in the chunk 121-2 become garbage and not reusable due to the immutable characteristic of the chunk. In this case, the ECS copies the remaining valid data segments, that is, the data 122 in the chunk 121-1 and the data 125 in the chunk 121-2, to the new chunk 121-X', thus the chunk 121-1 and 121-2 become completely empty and may be reclaimable as a unit. However, since the storage locations of the data 122 and 124 have changed, the metadata of the object 111-1 and the object 111-3 must also be changed to update the information of the chunk.

The object metadata operations are involved in the above process. However, on ECS, the operations related with object metadata is quite costly, because the chunk reference calculation of metadata changes, the synchronization between chunks and objects needs to consider geographical backup, synchronization between front-end object operations and background metadata update requests, etc. This results in garbage collection on the ECS being inherently inefficient and quite a costly operation.

In order to solve the above problems and other potential problems, embodiments based on the present disclosure proposes a logical space layer storage method to release the association relationship between the metadata of the object and the chunk, thereby reduce the complexity of the garbage collection.

With reference to FIG. 4 to FIG. 7, the method in accordance with embodiments of the present disclosure will be described in detail as below.

Figure 4:
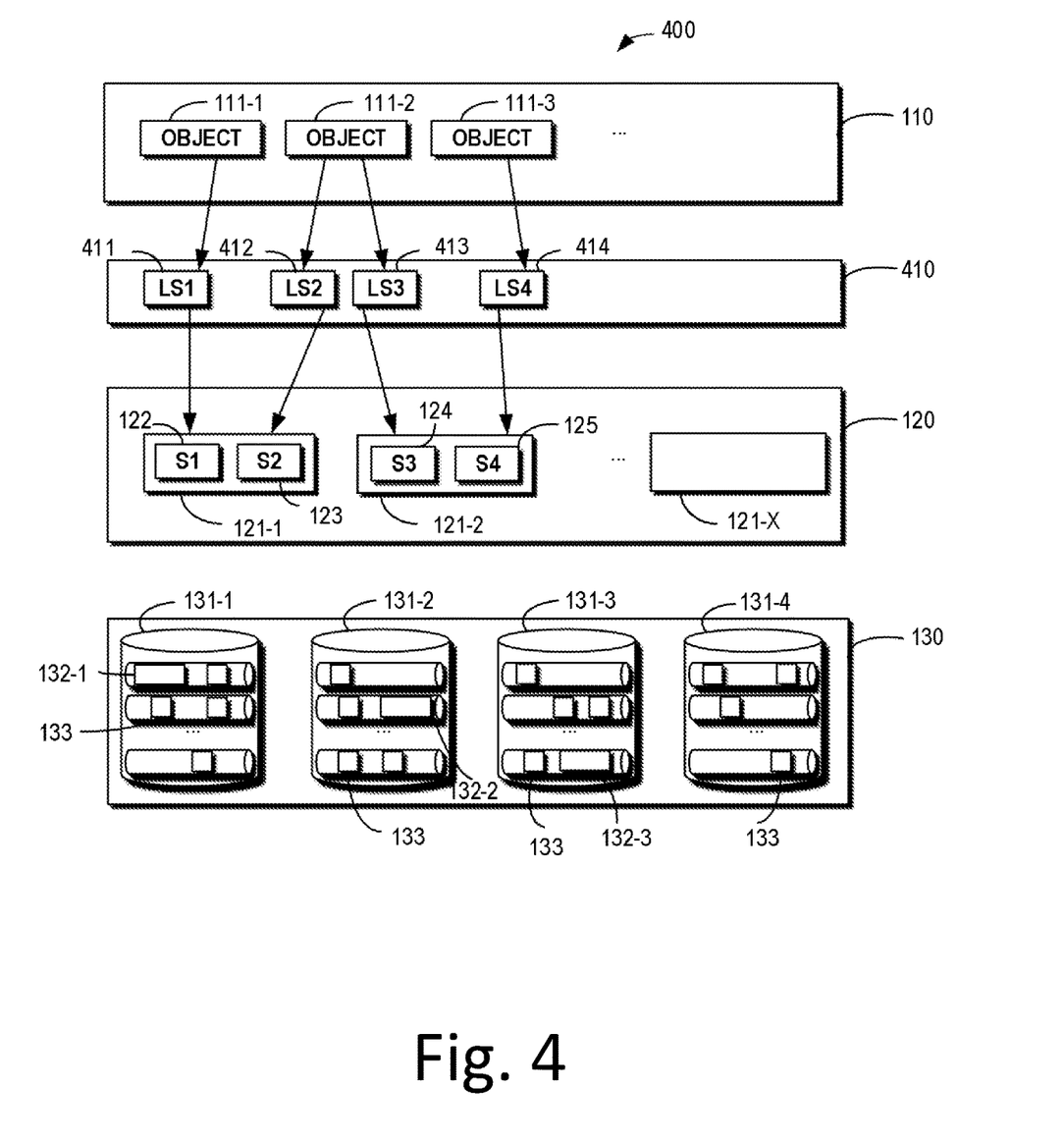
FIG. 4 shows a diagram of an exemplary system 400 in which the embodiments of the present disclosure can be implemented.
Figure 5:
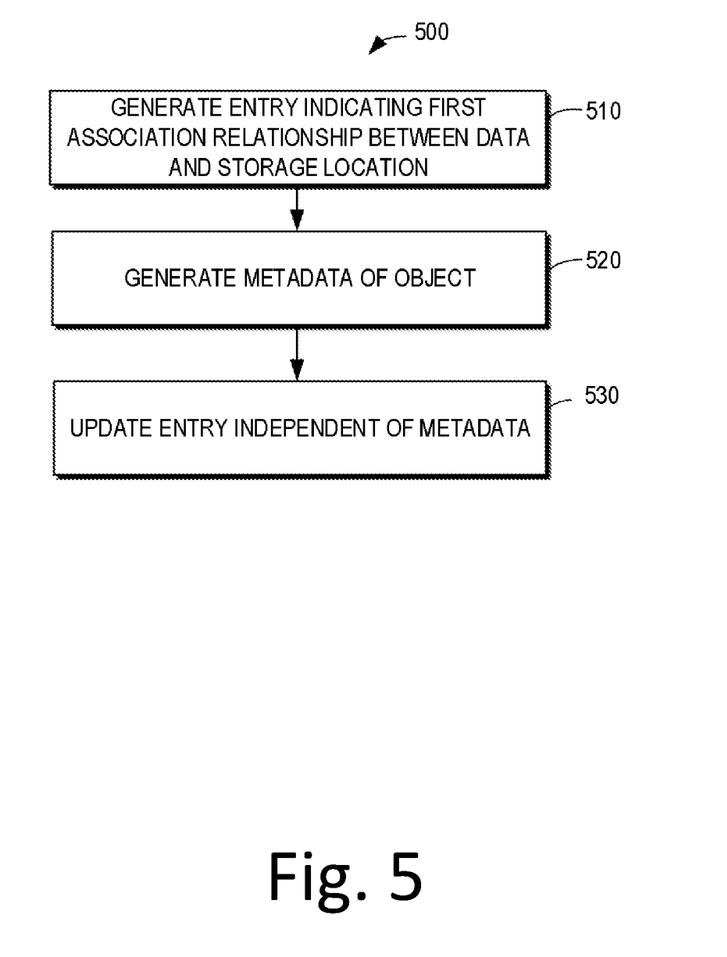
FIG. 5 shows a flowchart of a method 500 in accordance with embodiments of the present disclosure.

FIG. 4 shows a schematic diagram of an exemplary memory system 400 in which the embodiments of the present disclosure can be implemented. FIG. 5 shows a flowchart of a method 500 in accordance with embodiments of the present disclosure. The storage method in accordance with embodiments of the present disclosure is explained in detail in conjunction with FIGS. 4 and 5 firstly. For the sake of clarity, reference numerals consistent with FIG. 4 are used in FIG. 5 for the same or similar components.

As shown in FIG. 4, compared to the system 100 as shown in FIG. 1, the system 400 illustrated in FIG. 4 further comprises a logical space layer 410 in which a plurality of entries 411-414 are included. These entries 411-414 may indicate an association relationship between data of an object of the object layer 110 and a chunk.

In the following, the storage method implemented with system 400 is further illustrated with reference to the flowchart 500 shown in FIG. 5.

As shown in FIG. 5, at 510, if data associated with an object is stored in a storage location (i.e., a chunk described above), the system 400 generates an entry indicating a first association relationship between the data and the storage location.

For example, as shown in FIG. 4, the data 122 of the object 111-1 is stored in the chunk 121-1, and the entry 411 is generated in the logical space layer 410. This entry 411 indicates that the data 122 is stored in the chunk 121-1.

In some embodiments, system 400 may determine an identifier of a storage location where the data is stored. For example, the storage location of the data 122 is chunk 121-1. For example, an identifier "A" may be used as the identifier of the chunk 121-1.

In addition, system 400 may determine the range of storage space for data at a storage location. For example, the storage space of the data 122 may be in the range of [0, 2M]. For another example, for the object 111-2, both the data 123 and 124 are the data associated with the object 111-2 and therefore the data 123 and 124 together may be considered as the data of the object 111-2. However, the chunk 121-1 that stores the data 122 may not have enough space to store the entire data of the object 111-2, so the data is split into data 123 and 124, wherein the data 123 is stored in the chunk 121-1 and the data 124 is stored in the chunk 121-2. In this case, the range of the storage space of the data 123 and the data 124 may be represented, for example, as [0, 2M) and (2M, 4M], respectively. Such ranges may represent the first partial data 123 of the data of the object 111-2 occupies a range of 0-2M of the entire data (for example, 4M), and the second partial data 124 of the data of the object 111-2 occupies the range of 2M-4M of the entire data.

In some embodiments, the system 400 may generate a first association relationship in the entry based on the determined identifier of the storage location where the data is stored and the storage space of the data. In other words, the first association relationship in the entry indicates which data is stored in which storage location, i.e., in which chunk. For data 122, the entry 411 may be represented, for example, as ([0, 2M)->A/S1), where A is the identifier of the storage location and S1 is the data 122, whose size is 2M.

As shown in FIG. 5, at 520, the system 400 generates metadata of the object that indicates a second association relationship between the object and the entry. Through the second association relationship indicated by the metadata, the metadata of the object is only associated with the entry, which causes the direct association between the object and the storage location of the data and data to be released.

According to some embodiments, the system 400 generates an index of an entry associated with an object. The index may, for example, indicate an entry in the list of stored entries. For example, "LS1" may be used as an identity of entry 411 and may establish the association relationship of the index with object 111-1. The system 400 generates metadata by storing an index associated with an object. Still taking the entry 411 as an example, the metadata may be represented as ([0, 2M)->LS1) which may be stored at the object 111-1.

Continue referring to FIG. 5, at 530, if the first association relationship between the data and the storage location changes, the system 400 updates the entry independently of the metadata.

In some embodiments, if the storage location of the data is changed, the entry may be updated. It should be understood that the update of entry may be considered as the update of association relationship between the data and its storage location, i.e. the first association relationship described above.

Figure 6:
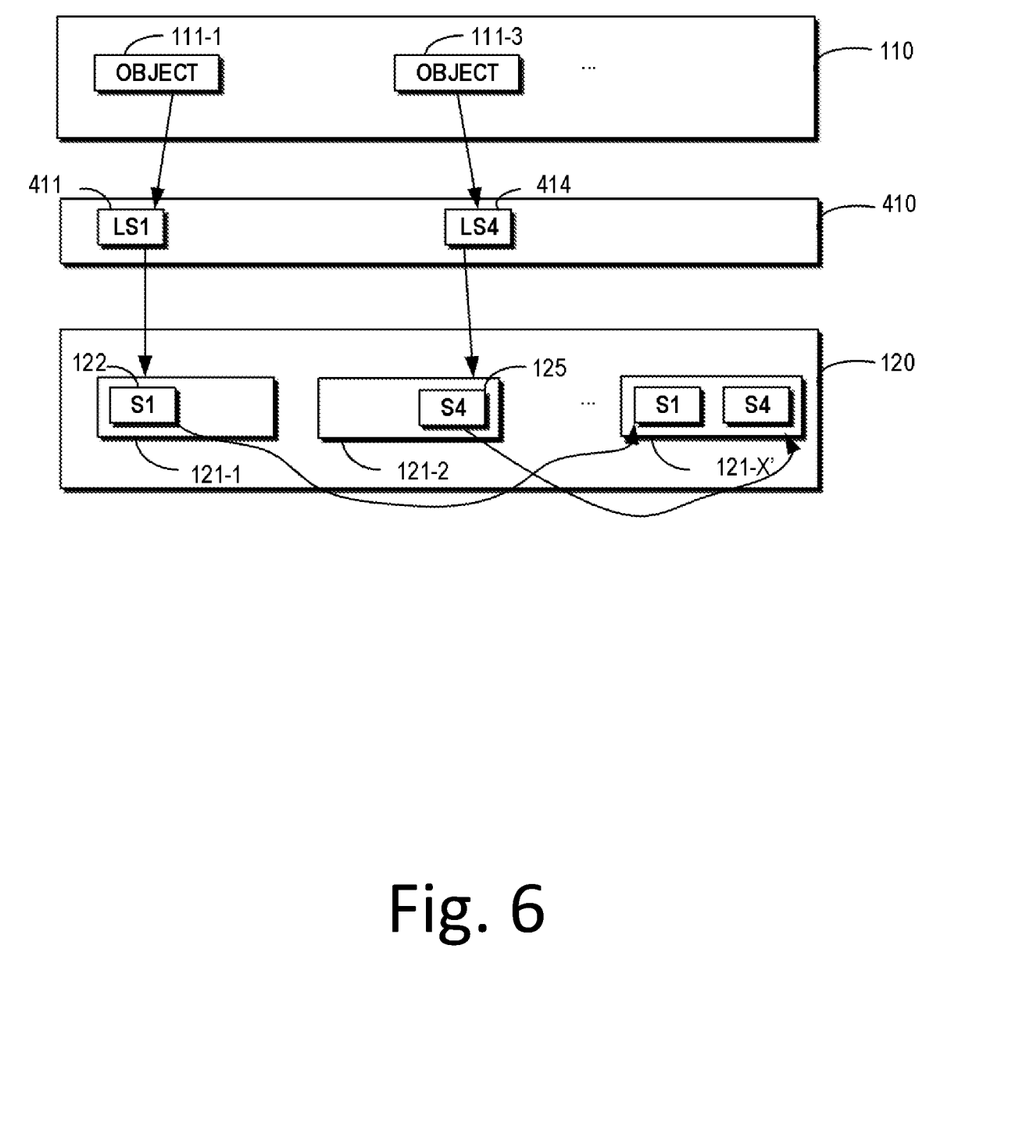
FIG. 6 shows a schematic diagram of an exemplary scenario in accordance with embodiments of the present disclosure.
Figure 7:
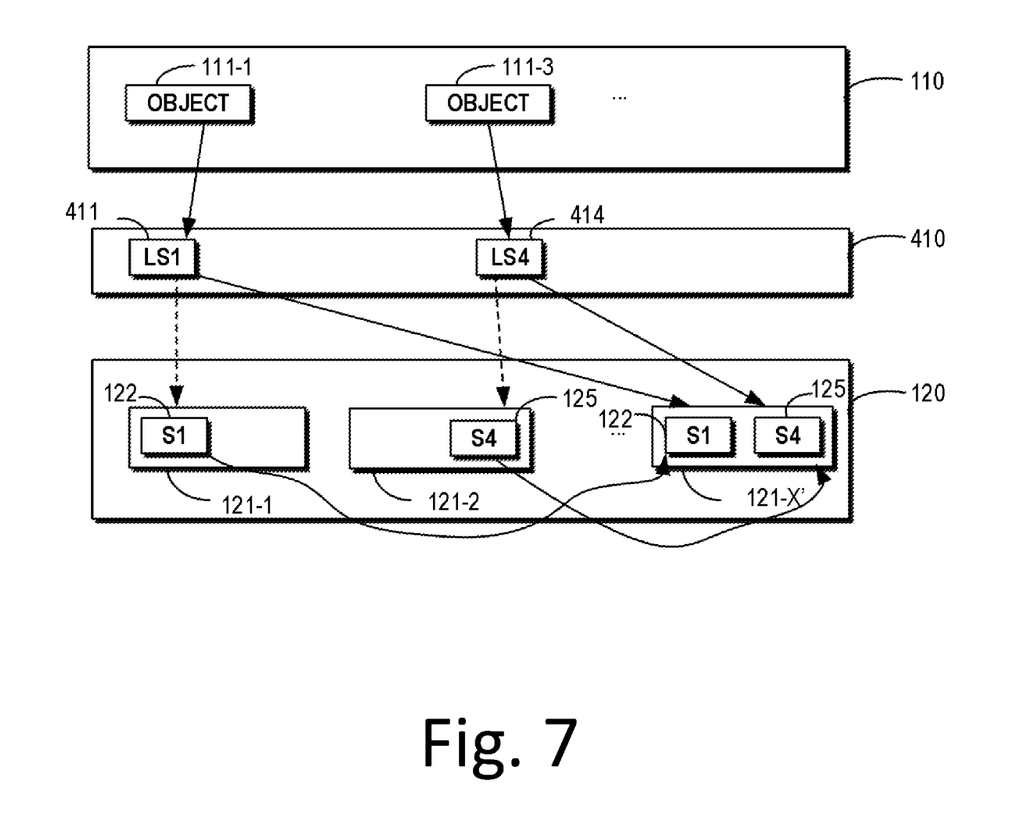
FIG. 7 shows a schematic diagram of an exemplary scenario in accordance with embodiments of the present disclosure.

The process of updating an entry will be described in detail below with reference to FIGS. 6 and 7. Referring to FIG. 6 firstly, compared to FIG. 3, the logical space layer 410 described above is introduced to FIG. 6. Currently, there are entries 411 and 414 in the logical space 410. The entry 411 indicates the association relationship between the data 122 and its storage location, i.e., the chunks 121-1, and the entry 414 indicates the association relationship between the data 125 and its storage location, i.e., the chunk 121-2.

In order to completely release the space of the chunks 121-1 and 121-2 and reclaim them to the hardware layer, the system 400 moves the data 122 and the data 125 to a new storage location, i.e., the chunk 121-X'. After the storage location changes, entries 411 and 414 update the association relationship of the corresponding data and storage locations indicated by the entries, respectively. For example, the entry 411 may be changed from the ([0, 2M)->A/S1) to ([0, 2M)->X'/S1).

In this way, it can be seen that, only the content indicated by the entry 411 has changed. That is, the change only occurs on the logical space layer 410. The metadata of the object 111-1 in the object layer remains as ([0, 2M)->LS1). That is to say, the change of the chunk that stores data 122 does not impact the metadata of the object 111-1. The system 400 only needs to update the entry, i.e. update the association relationship of the data with the storage location indicated by the entry. As shown in FIG. 7, the entry 411 is updated to be associated with new chunk 121-X' that stores the data 122.

According to some embodiments, if the data is invalid, the system 400 removes an entry associated with the data and updates the metadata associated with the object, to remove the information of the entry. As shown in FIGS. 6 and 7, compared to FIG. 4, data 123 and data 124 are removed and the corresponding entries are removed as well.

Embodiments of the present disclosure may avoid the huge cost of changing metadata multiple times. Although the entries in the logical space layer may be changed, the cost of changing the logical space layer is much lower than that of the object layer, because the object metadata is much larger than the logical space marker. The former comprises more metadata than the range mapping, and may be hundreds of KB or even MB/GB/ . . . , but the latter is just marker together with a pointer, at most hundreds of bytes. The calculation of the garbage by the iterative identification is easier than by the object metadata.

In addition, no more object metadata updates from partial garbage handling, so reduce system load and impacts to front-end load. Thus, the mapping changes between the logical space layer and the chunk layer occur independently in each region. Compared to geo backup on object metadata updates, efforts on geo-synchronization are saved.

Figure 8:
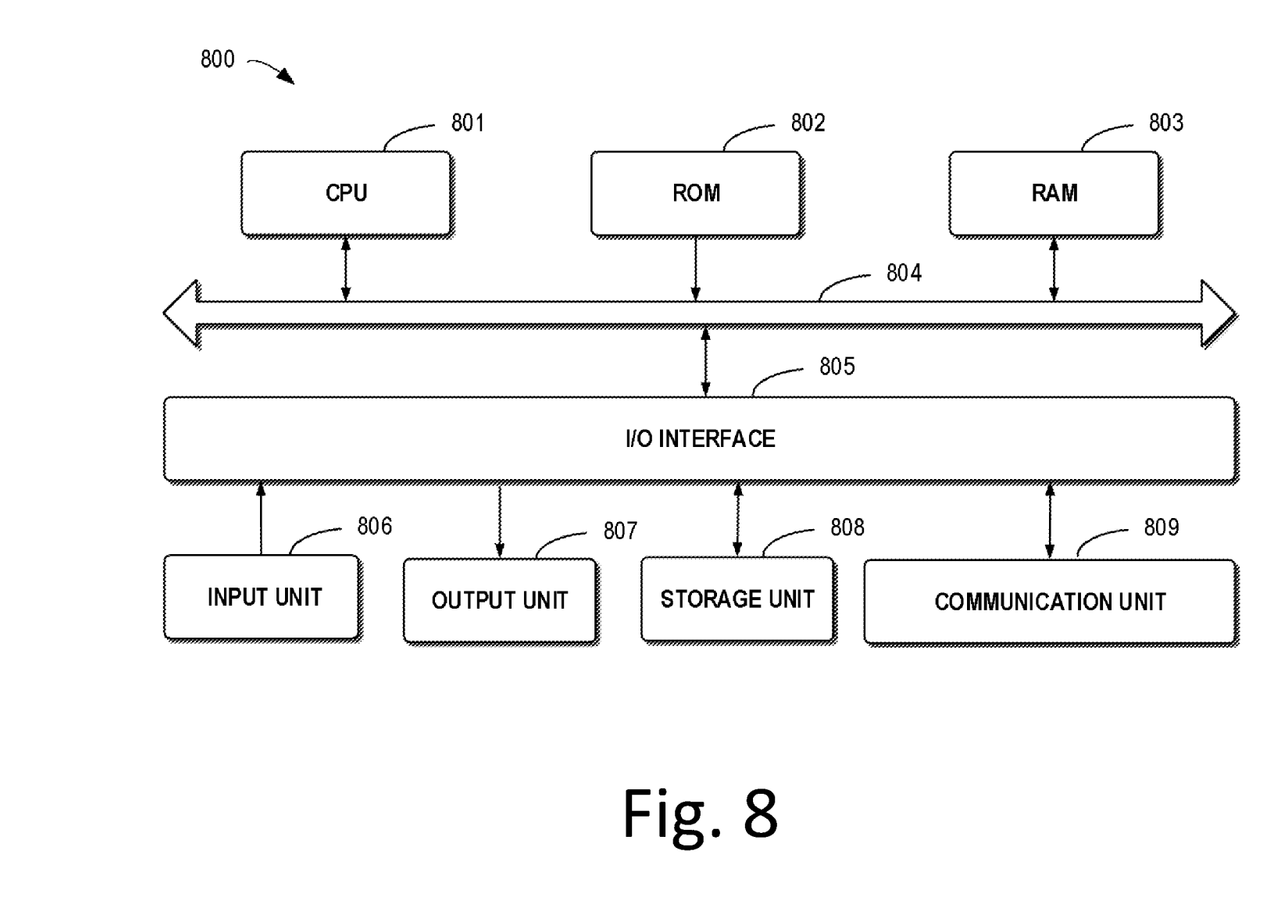
FIG. 8 shows a schematic block diagram of a device 600 for implementing embodiments of the present disclosure.

FIG. 8 is a schematic block diagram illustrating a device 800 that may be used to implement embodiments of the present disclosure. As shown in FIG. 8, the device 800 comprises a central processing unit (CPU) 801 which can execute various appropriate actions and processing based on the computer program instructions stored in a read-only memory (ROM) 802 or the computer program instructions loaded into a random access memory (RAM) 803 from a storage unit 804. The RAM 803 also stores all kinds of programs and data required by operating the storage device 800. CPU 801, ROM 802 and RAM 803 are connected to each other via a bus 804 to which an input/output (I/O) interface 805 is also connected.

A plurality of components in the device 800 are connected to the I/O interface 805, comprising: an input unit 806, such as keyboard, mouse and the like; an output unit 807, such as various types of displays, loudspeakers and the like; a storage unit 808, such as magnetic disk, optical disk and the like; and a communication unit 809, such as network card, modem, wireless communication transceiver and the like. The communication unit 809 allows the device 800 to exchange information/data with other devices through computer networks such as Internet and/or various telecommunication networks.

Each procedure and processing as described above, such as method 500, can executed by the processing unit 801. For example, in some embodiments, method 500 can be implemented as computer software programs which are tangibly comprised in a machine-readable medium, such as the storage unit 804. In some embodiments, the computer program can be partially or completely loaded and/or installed to the device 800 via the ROM 802 and/or the communication unit 809. When the computer program is loaded to the RAM 803 and executed by the CPU 801, one or more steps of the above described method 300 are implemented.

The present disclosure may be a system, a device and/or a computer program product. The computer program product may comprise a computer readable storage medium (or media) having computer readable program instructions thereon for carrying out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium comprises the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local region network, a wide region network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local region network (LAN) or a wide region network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for data processing, comprising:
in response to data associated with an object being stored in a storage location, generating, by a system comprising a processor, an entry indicating a first association relationship between the data and the storage location, the first association relationship defining the data and the storage location of the data;
generating metadata of the object, the metadata indicating a second association relationship between the object and the entry, the second association relationship defining a location of the entry in relation to the object; and
in response to the first association relationship between the data and the storage location being changed, updating the entry and maintaining the second association relationship of the metadata.

2. The method of claim 1, wherein the generating the entry comprises:
determining an identifier of the storage location where the data is stored; and
generating the first association relationship in the entry by associating the identifier with a range of storage space for the data at the storage location.

3. The method of claim 2, wherein the generating the entry further comprises:
determining the range of storage space for the data at the storage location.

4. The method of claim 1, wherein the generating the metadata comprises:
generating an index of the entry associated with the object.

5. The method of claim 4, wherein the generating the metadata further comprises:
generating the metadata by storing the index in association with the object.

6. The method of claim 1, wherein the updating the entry comprises:
in response to the storage location of the data being changed, performing the updating the entry.

7. The method of claim 1, further comprising: in response to the data being invalid, removing the entry associated with the data, comprising removing the first association relationship.

8. A device for data processing, comprising:
at least one processor; and
a memory coupled to the at least one processor and comprising instructions stored therein, the instructions, when executed by the at least one processor, cause the device to perform acts comprising:
in response to data associated with an object being stored in a storage location, generating an entry indicating a first association relationship between the data and the storage location, the first association relationship defining the data and the storage location of the data;
generating metadata of the object, the metadata indicating a second association relationship between the object and the entry, the second association relationship defining a location of the entry in relation to the object; and
in response to the first association relationship between the data and the storage location being changed, updating the entry and maintaining the second association relationship of the metadata.

9. The device of claim 8, wherein the generating the entry comprises:
determining an identifier of the storage location where the data is stored;
determining a range of storage space for the data at the storage location; and
generating the first association relationship in the entry by associating the identifier with the range.

10. The device of claim 8, wherein the generating the metadata comprises:
generating an index of the entry associated with the object; and
generating the metadata by storing the index in association with the object.

11. The device of claim 8, wherein the updating the entry comprises:
in response to the storage location of the data being changed, performing the updating the entry.

12. The device of claim 8, wherein the acts further comprise: in response to the data being invalid, removing the entry of the object, comprising removing the first association relationship.

13. A computer program product being tangibly stored on a non-transitory computer-readable medium and comprising machine-executable instructions which, when executed, cause a machine to perform operations, comprising:
in response to data associated with an object being stored in a storage location, generating an entry indicating a first association relationship between the data and the storage location, the first association relationship defining the data and the storage location of the data;
generating metadata of the object, the metadata indicating a second association relationship between the object and the entry, the second association relationship defining a location of the entry in relation to the object; and in response to the first association relationship between the data and the storage location being changed, updating the entry and maintaining the second association relationship of the metadata.

14. The computer program product of claim 13, wherein the generating the entry comprises:

determining an identifier of the storage location where the data is stored; and generating the first association relationship in the entry by associating the identifier with a range of storage space for the data at the storage location.

15. The computer program product of claim 14, wherein the generating the entry further comprises:

determining the range of storage space for the data at the storage location.

16. The computer program product of claim 13, wherein the generating the metadata comprises:

generating an index of the entry associated with the object.

17. The computer program product of claim 16, wherein the generating the metadata further comprises:

generating the metadata by storing the index in association with the object.

18. The computer program product of claim 13, wherein the updating the entry comprises:

in response to the storage location of the data being changed, initiating the updating the entry.

19. The computer program product of claim 13, wherein the operations further comprise: in response to the data being invalid, removing the entry of the object, comprising removing the first association relationship.

\* \* \* \* \*